United States Patent [19]

Horike et al.

[11] Patent Number: 4,535,339

[45] Date of Patent: Aug. 13, 1985

[54] DEFLECTION CONTROL TYPE INK JET RECORDER

[75] Inventors: Masanori Horike, Tokyo; Tatsuya Furukawa, Yokohama; Yutaka Ebi, Kawasaki; Hiroshi Yamazaki, Tokyo, all of Japan

[73] Assignee: Ricoh Company, Ltd., Tokyo, Japan

[21] Appl. No.: 525,390

[22] Filed: Aug. 22, 1983

[30] Foreign Application Priority Data

Sep. 1, 1982 [JP] Japan ............................... 57-151930

[51] Int. Cl.$^{3}$ ............................................ G01D 15/18

[52] U.S. Cl. ........................................................ 346/75

[58] Field of Search ........................................... 346/75

[56] References Cited

U.S. PATENT DOCUMENTS 4,292,640 9/1981 Lammers et al. ..................... 346/75

4,435,720 3/1984 Horike et al. ......................... 346/75

*Primary Examiner*—E. A. Goldberg

*Assistant Examiner*—Gerald E. Preston

*Attorney, Agent, or Firm*—David G. Alexander

[57] ABSTRACT

The velocity of flying charged ink drops is detected and the ink pressure is so controlled as to make the ink velocity coincide with a predetermined target velocity. A gutter for catching non-printing ink drops is made of a conductive material, while a charge detector circuit is connected to the gutter to generate a signal indicative of a potential change corresponding to impingement of a charged ink drop on the gutter, thereby detecting the flight of a charged ink drop. The pump pressure is varied in response to a difference between the actual and target velocities so that the ink pressure or velocity is adjusted in arithmetic progression reducing a time period required for the actual velocity to converge to the target.

6 Claims, 8 Drawing Figures

DEFLECTION CONTROL TYPE INK JET RECORDER

BACKGROUND OF THE INVENTION

The present invention relates to an ink jet recording apparatus of the type which ejects ink from a nozzle while applying oscillation thereto, selectively charges ink drops by a charging electrode located in a position where the ink from the nozzle separates into a drop, deflects charged ink drops by a deflection electrode to cause them to impinge on predetermined positions on a sheet. More particularly, the present invention is concerned with a control over the pressure of ink in a recorder of the type mentioned.

In an ink jet recorder of the type concerned, the sheet is usually spaced a relatively long distance from the ink ejection nozzle. Therefore, the ink pressure is designed high enough for ink drops to stably fly as far as the sheet despite the influence of the charging and deflecting electric fields. Stable and accurate controls over the ink viscosity and pressure, oscillation pressure, charge amount, deflection electric field and the like is another important consideration for regularly forming drops of a predetermined size and causing them to accurately fly predetermined deflection paths. Further adequate charging of drops is unattainable unless a charge voltage or pulse is applied precisely timed to the separation of a drop from the ink.

In light of the above, there has been employed a phase search before a record charge control in order to stabilize the ink to a predetermined pressure and/or a predetermined viscosity while predetermining a timing for the application of charge pulses. For the phase search, a contact or non-contact type charge detector electrode is connected to a charge detector circuit whose major components are an amplifier, an integrator and a comparator. A charge pulse having a short duration is applied to the charging electrode, and the phase of the charge pulse relative to the separation of an ink drop is sequentially shifted. When the charge detector circuit produces an output declaring "charged", the instantaneous phase of the charge signal is predetermined to be the adequate charging phase.

The deflection is effected by a flying velocity of an ink drop (hereinafter referred to as drop flight velocity). An expedient heretofore proposed for overcoming this problem is to detect a drop flight velocity and to adjust an ink pressure until the actual velocity coincides with a predetermined target velocity.

In the proposed ink velocity detection and ink pressure adjustment system, a desired result will be achieved if the ink pressure is stabilized at a predetermined level. In practice, however, because the ink is compressed by a pump, the fluctuation of ink pressure corresponding to the periodic pulsation of the pump delivery pressure shows itself, if a little, in the ink inside the ink ejection head even though passed through an accumulator. While the ink pressure fluctuation may be completely eliminated by enlarging the capacity of the accumulator, a larger accumulator capacity is accompanied by a longer period of time while the ink pressure downstream of the accumulator takes to become stabilized at a predetermined level after a change in the delivery pressure of the pump. This translates into a disproportionate period of time for ink pressure adjustment in which the ink pressure is varied while detecting a drop flight velocity, so that the velocity finally converges to a target velocity. Therefore, a certain degree of fluctuation is inevitable in the pressure of ejected ink resulting in irregularity in the detection of ink velocity, error in the ink pressure adjustment, failure in setting a desired ink velocity, etc.

Another drawback inherent in the prior art apparatus is that not only drop flight velocities lower than a certain limit cannot be detected, but a velocity detector circuit is constructed to integrate the flight time of a plurality of charged ink drops and, based on the result of integration, determine whether or not the velocity is adequate, consuming a substantial period of time.

In another known velocity detection system, two static induction type electrodes are positioned along an ink flight path. The drop flight velocity is determined by counting a time which a charged ink drop takes to be detected by the second electrode after being detected by the first. A problem encountered with this type of system is the poor reliability of operation due to a low detection accuracy particular to a static induction type electrode and progressive deterioration of accuracy. For a higher accuracy, the distance between the nozzle and the gutter, i.e., the distance the ink drops fly, has to be increased. Accuracy is also required in the physical installation of the detection electrode which renders the construction intricate.

SUMMARY OF THE INVENTION

It is therefore an object of the present invention to provide a deflection control type ink jet recording apparatus which is of the type detecting a flight velocity of charged ink drops and controlling the ink pressure to bring the actual velocity into coincidence with a target velocity, and is capable of quickly and accurately detecting a drop flight velocity to promote fast adjustment of ink pressure.

It is another object of the present invention to provide a generally improved deflection control type ink jet recording apparatus.

A deflection control type ink jet recording apparatus of the present invention has an ink ejection head equipped with an ink ejection nozzle and a vibrator for applying pressure oscillation having a predetermined period to ink in an ink chamber, which communicates to the ink ejection nozzle, a pump for supplying ink under pressure to the ink ejection head, a charging electrode for applying a charging electric field to ink ejected from the nozzle, charge voltage generator means for applying a charge voltage to the charging electrode, and a deflection electrode for applying a deflecting electric field to charged ink drops. Means for detecting arrival of a charged ink drop is located in an ink flight path or neighborhood thereof, the ink flight path extending from the charging electrode to a recording sheet. Electric circuit means is connected to the charged ink drop arrival detecting means for generating a signal indicative of the arrival of a charged drop. Charge voltage generator means generates a charge voltage for controlling an ink pressure. Sync means is provided for synchronizing the charge signal for ink pressure control to a pump drive signal. Ink pressure adjuster means supplies a pump drive circuit, which drives the pump, an ink pressure command signal which is based on a period from an instant of charging of an ink drop in response to the ink pressure control charge signal to an instant of detection of a charged ink drop, starting from a point where the ink pressure control charge signal appears.

In accordance with the present invention, the velocity of flying charged ink drops is detected and the ink pressure is so controlled as to make the ink velocity coincide with a predetermined target velocity. A gutter for catching non-printing ink drops is made of a conductive material, while a charge detector circuit is connected to the gutter to generate a signal indicative of a potential change corresponding to impingement of a charged ink drop on the gutter, thereby detecting the flight of a charged ink drop. The pump pressure is varied in response to a difference between actual and target velocities so that the ink pressure or velocity is adjusted in arithmetic progression, reducing a time period required for the actual velocity to converge to the target.

The above and other objects, features and advantages of the present invention will become apparent from the following detailed description taken with the accompanying drawings.

DESCRIPTION OF THE PREFERRED EMBODIMENT

While the deflection control type ink jet recording apparatus of the present invention is susceptible of numerous physical embodiments, depending upon the environment and requirements of use, a substantial number of the herein shown and described embodiment have been made, tested and used, and all have performed in an eminently satisfactory manner.

Figure 1:
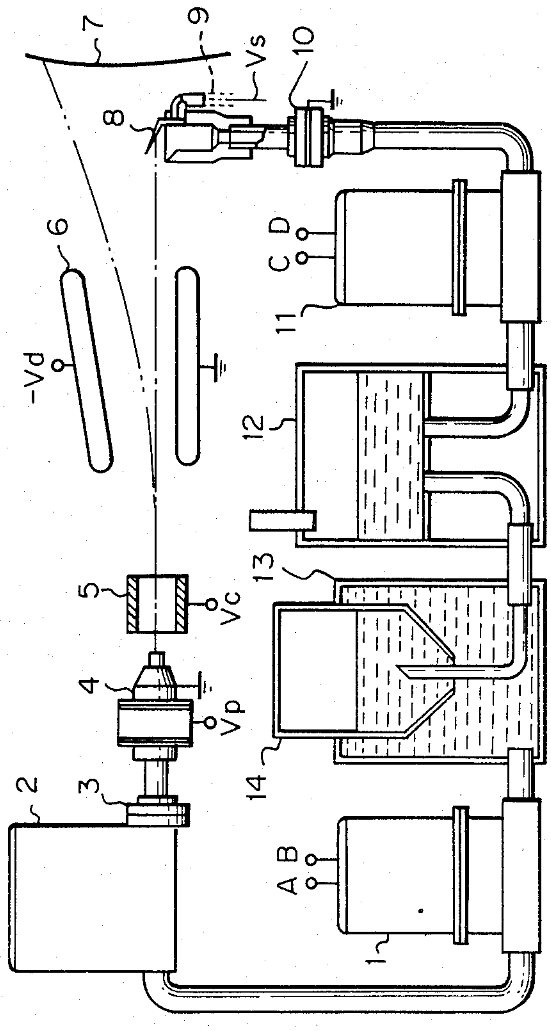
FIG. 1 is a partly sectional side elevation showing a general construction of an ink processing system in accordance with the present invention.

Referring to FIG. 1 of the drawings, a mechanical arrangement of a recorder embodying the present invention is shown. An ink cartridge 14 is mounted in a reservoir 13. A pump 1 compresses the ink in the reservoir to feed it under pressure to an accumulator 2. Ink from the accumulator is routed to an ink ejection head 4 after having pressure fluctuation thereof suppressed by the accumulator 2 and a filter 3.

The head 4 includes an electrostrictive vibrator which is driven at a predetermined period and a predetermined amplitude to in turn apply pressure oscillation having a predetermined period and amplitude to the ink communicated to the head 4. The vibration causes the ink to be ejected from a nozzle of the head 4 and then separate into a drop at a position spaced a predetermined distance from the nozzle front. The separation of the ink has correspondence with the pressure oscillation applied to the pressurized ink, that is, ink drops are formed one for each period of the pressure oscillation. Timed to the separation of an ink drop, a charge voltage is selectively applied to a charging electrode 5 to deposite a charge on the ink drop. Charged drops are deflected by an electric field developed by deflection electrodes 6 to impinge on a sheet 7, while uncharged drops fly straight toward a conductive gutter 8. The drops caught by the gutter 8 are sucked by a pump 11 via a filter 10 to be returned to the reservoir 13 by way of a deaerator 12.

Figure 2:
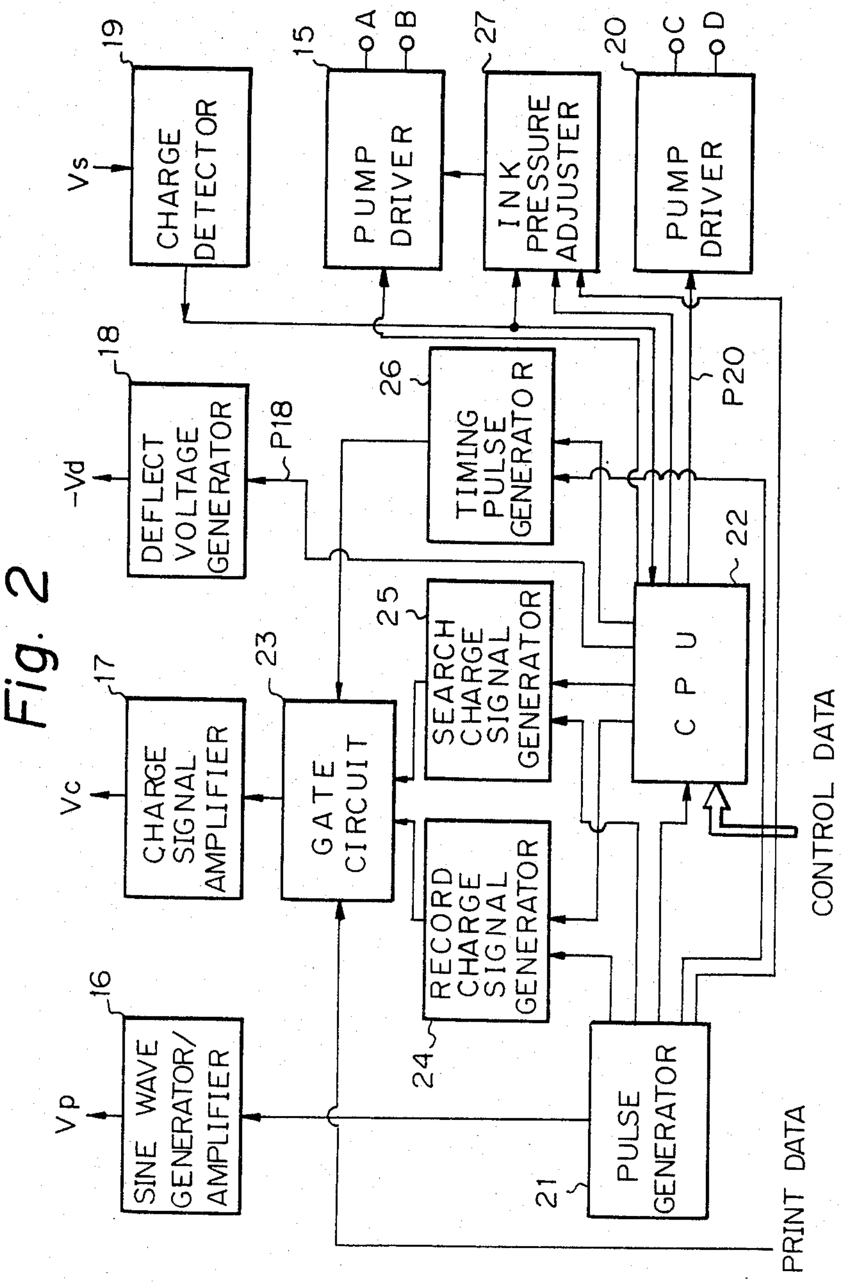
FIG. 2 is a block diagram of an electrical arrangement associated with the system of FIG. 1.

Referring to FIG. 2, an electric circuitry associated with the recorder shown in FIG. 1 includes a sinusoidal wave generator and amplifier circuit 16 which supplies the vibrator in the head 4 with a drive voltage. A charge signal amplifier circuit 17 prepares a charge voltage or pulse to be supplied to the charging electrode 5. A deflection voltage generator circuit 18 delivers a high voltage of a predetermined level across the deflection electrodes 6. A shield wire 9 extends out from the conductive gutter 8 to a charge detector circuit 19. A pump driver 15 is connected to the pump 1, and a pump driver 20 to the pump 11.

In the illustrated embodiment, the recorder is furnished with a timing pulse generator 26, a search charge signal generator 25, and a record charge signal generator 24. Functions respectively assigned to these elements are charging drops at a predetermined timing in the detection of a velocity of flying drops (ink pressure search), applying search pulses to the electrode 5 in a phase search which is adapted to bring the center of a charge pulse to the drop separation phase, and supplying the electrode 5 with record charge voltage having different stepwise levels during a printing operation. The output signals of the generators 26, 25 and 24 are selectively coupled to the charge signal amplifier 17 via a gate circuit 23. The various elements of the circuitry operate at timings which are dependent on a plurality of kinds of timing pulses which a pulse generator 21 delivers. A microcomputer 22 is used for controlling the operations of the various elements.

Figure 3A:
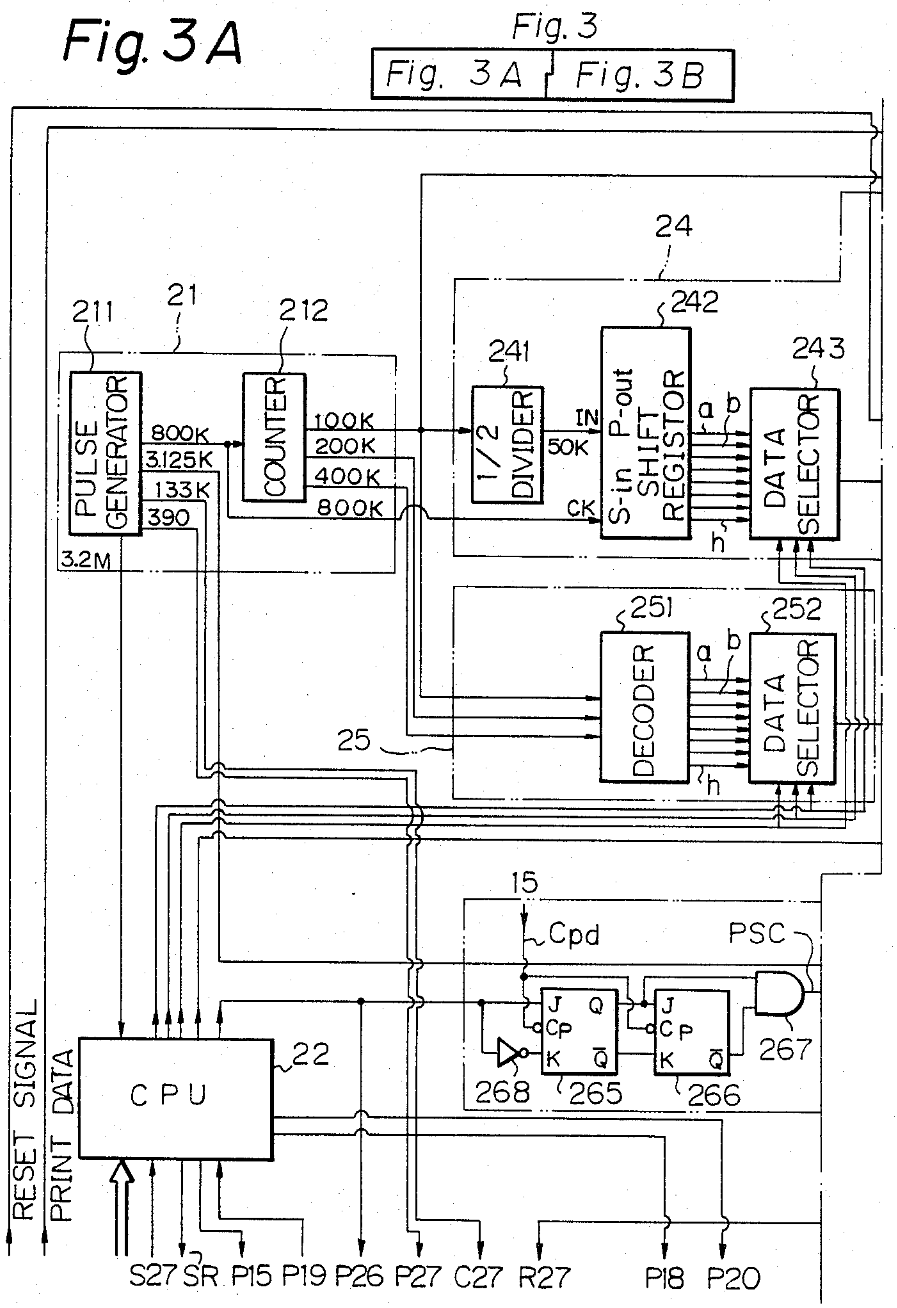
FIG. 3 (3A and 3B complimentary) is a circuit diagram representing part of the construction shown in FIG. 2.
Figure 3B:
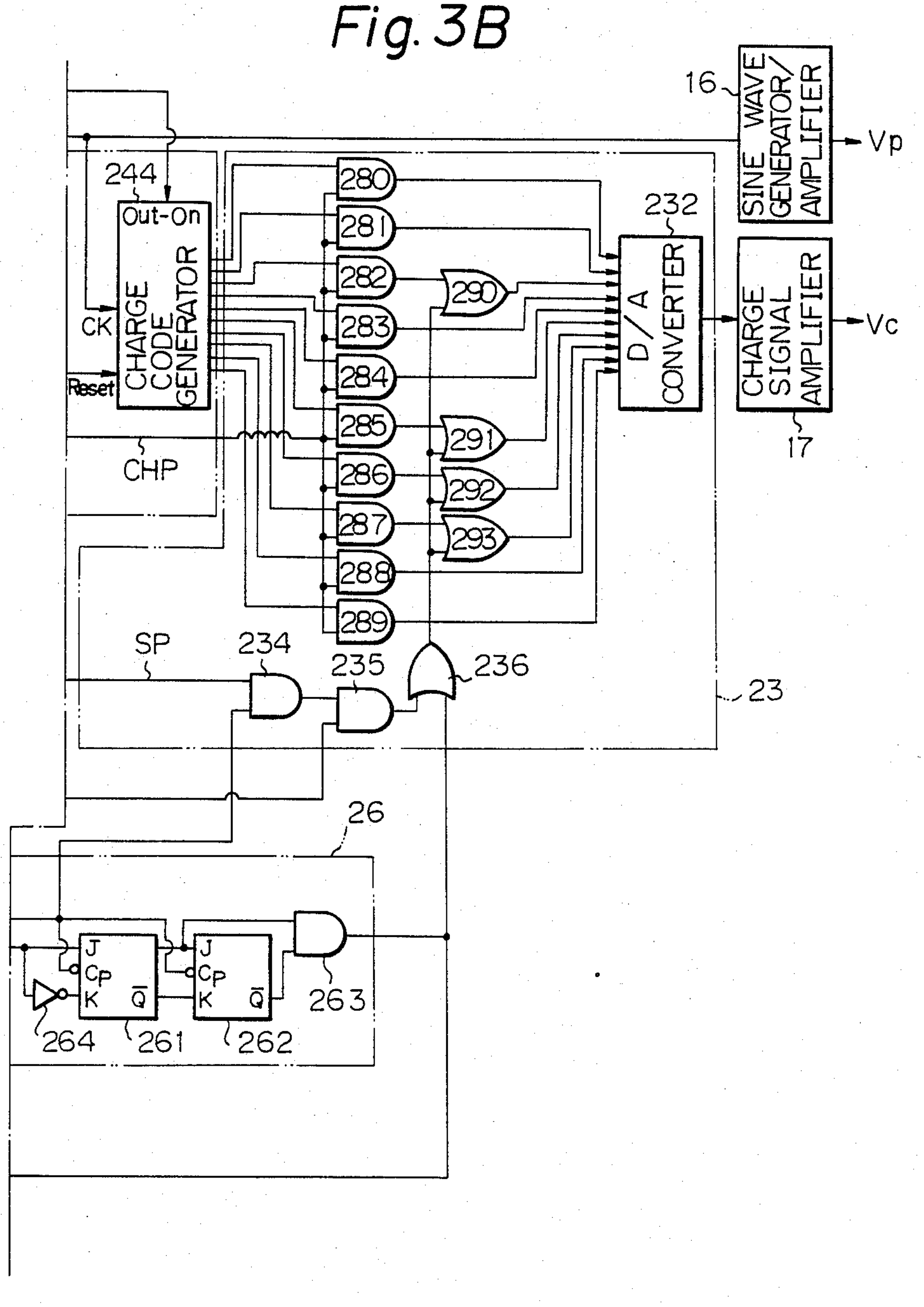

Shown in FIG. 3 are detailed constructions of the pulse generator 21, gate circuit 23, record charge signal generator 24, search charge signal generator 25 and timing pulse generator 25, and connections thereof with the microcomputer 22. As shown, the pulse generator 21 comprises a pulse generation network 211 including a quartz oscillator and a frequency dividing counter, and a frequency dividing couter 212, thereby producing eight different kinds of 50% duty pulses whose frequencies are 3.2 MHz, 800 kHz, 400 kHz, 200 kHz, 100 kHz, 100/32=3.125 kHz, 133 kHz and 390 kHz. The 100 kHz pulses are delivered to the sinusoidal wave generator and amplifier 16. In response to these inputs, the circuit 16 generates a sinusoidal wave of the basic frequency component of the input and supplies the sinusoidal wave to the vibrator in the head after amplifying it.

With the above construction, the ink in the head 4 is subjected to pressure oscillation of the 100 kHz frequency and thereby separated into drops at the rate of $100\times 10^3$ drops/sec which fly toward the gutter 8 or the sheet 7. Stated another way, drops are formed at the frequency of 100 kHz.

Figure 5:
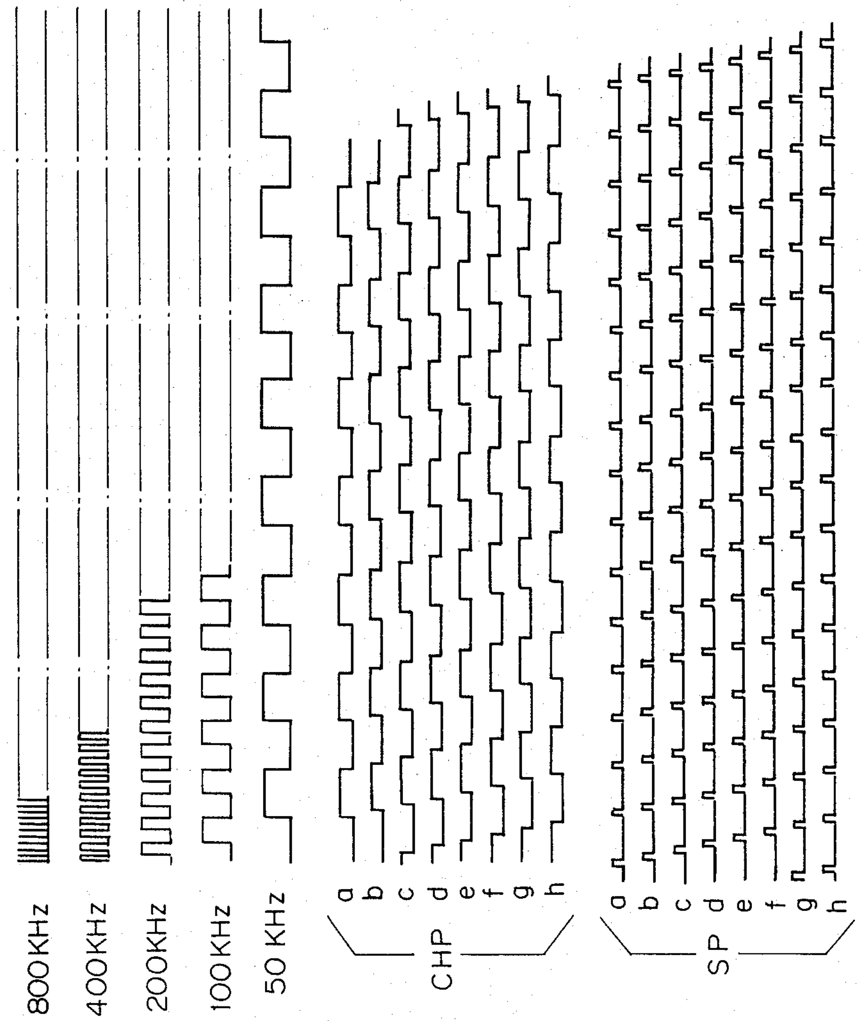
FIG. 5 is a timing chart showing signals delivered to and from a record charge signal generator of FIG. 3.

The record charge signal generator 24 comprises a counter (T flip-flop) 241 for $\frac{1}{2}$ frequency division, a serial-in, parallel-out 8-bit shift register 242, a data selector 243, and a charge code generator 244 made up of a counter, a decoder and an output gate. Supplied with the 100 kHz pulses, the counter 241 delivers 50 kHz pulses to the shift register 242 as input data. The shift register 242 is clocked by the 800 kHz pulses from the pulse generator 21. A set of eight pulses (CHP) output from the shift register 242 are shown in FIG. 5. These eight kinds of pulses are supplied to the data selector 243. Also supplied to the data selector 243 is a 3-bit output control code which selects one out of the eight different types of pulses.

Because the shift register 242 is clocked by the 800 kHz pulses, the eight kinds of pulses a to h in FIG. 5 are sequentially delayed in phase by 0.00125 msec but common in period and duty. One of the pulses specified by the 3-bit control code fed to the data selector 243 is supplied to AND gates 280–289.

The search charge signal generator 25 comprises a decoder 251 and a data selector 252. The decoder 251 is supplied with the 100 kHz, 200 kHz and 400 kHz pulses from the pulse generator 21. The decoder 251, in response to such pulses, produces eight sets of pulses a to h, generally SP, as shown in FIG. 5. The pulses a to h commonly have a width of 0.00125 msec and are sequentially shifted in phase by an amount equal to the pulse width, i.e. 0.00125 msec. The 3-bit control code fed to the data selector 243 of the record charge signal generator 24 is also supplied to the data selector 252. The outputs a to h of the data selectors 243 and 252 selectively appear depending on the control code as shown below.

| CONTROL CODE | 000 | 001 | 010 | 011 | 100 | 101 | 110 | 111 |
|---|---|---|---|---|---|---|---|---|
| 243 OUTPUT | a | b | c | d | e | f | g | h |
| 252 OUTPUT | d | e | f | g | h | a | b | c |

The output pulses of the data selector 252 are fed to an AND gate 234 of the gate circuit 23.

The timing pulse generator 26 comprises two J-K flip-flops 261 and 262, an AND gate 263, and an inverter 264, and two J-K flip-flops 265 and 266, an AND 267 and an inverter 268. The timing pulse generator 26 is clocked by the 100/32 or 3.125 kHz pulses from the pulse generator 21, and supplied by one high level pulse from the microcomputer 22 for each time of detection of an ink drop velocity. The high level pulse has a width of 0.36 msec which is somewhat larger than 32 periods 50 kHz. Further, the timing pulse generator 26 is supplied by the pump driver 15 with a pump drive signal Cpd whose frequency is adjusted by an output command of an ink pressure adjust circuit 27 to a level higher or lower than 50 Hz.

Figure 6:
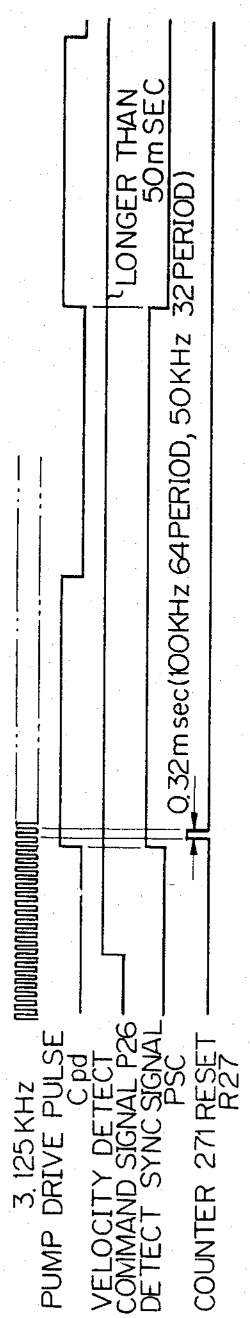
FIG. 6 is a timing chart showing signals delivered to and from a timing pulse generator of FIG. 3.

Signals incoming and outgoing the timing pulse generator 26 are shown in FIG. 6. The output of the AND gate 263 of the timing pulse generator 26 (R27) is fed to the gate circuit 23.

Figure 4A:
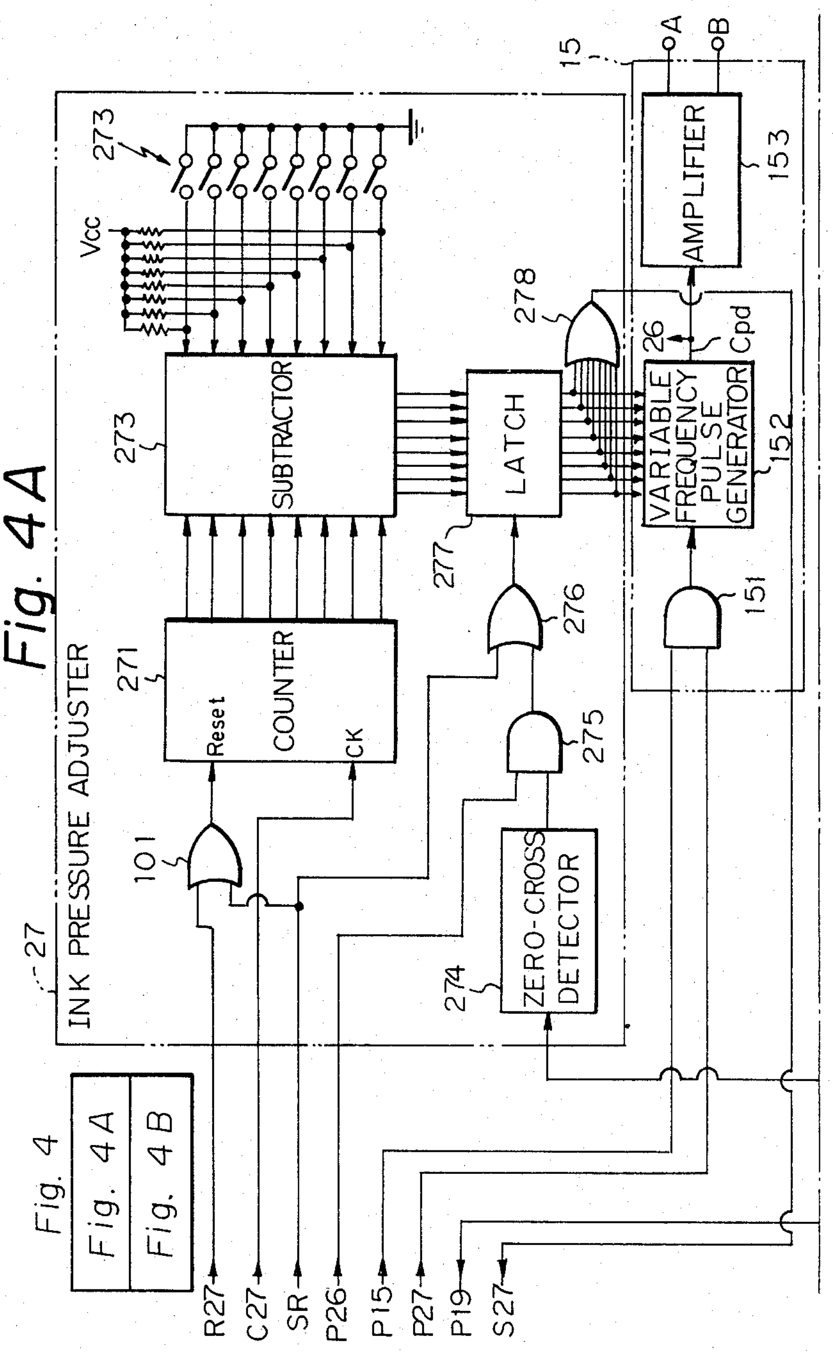
FIG. 4 (4A and 4B complimentary) is a circuit diagram showing another part of the construction of FIG. 2.
Figure 4B:
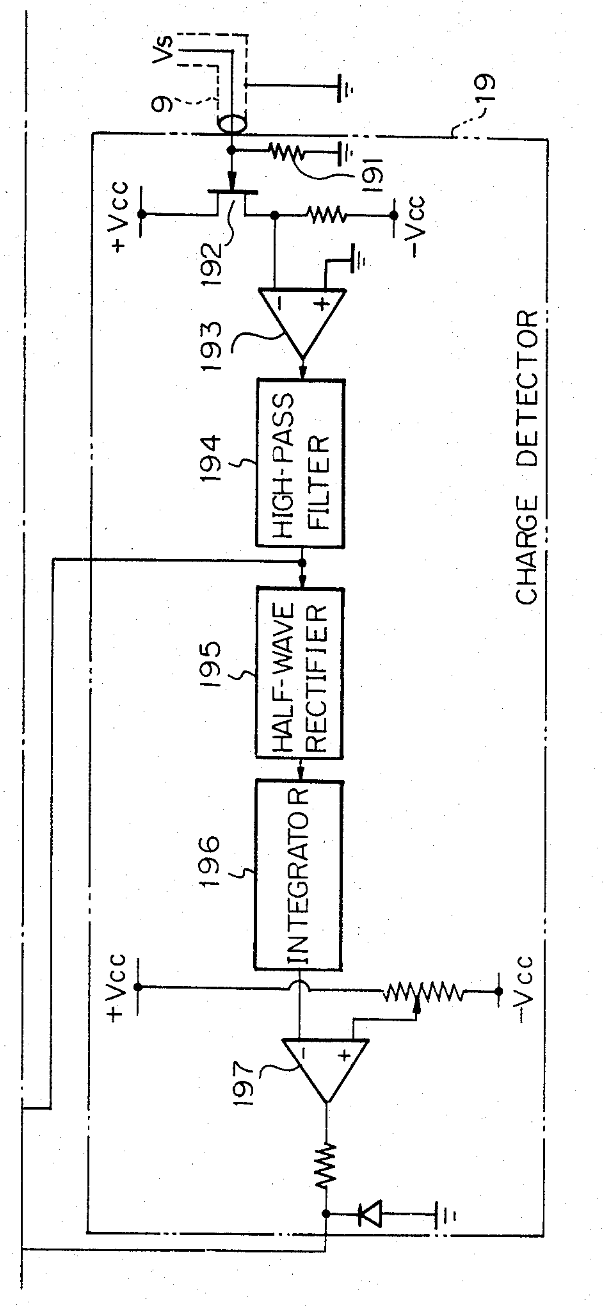

Referring to FIG. 4, details of the pump driver 15, charge detector 19 and ink pressure adjuster 27 are shown. The pump driver 15 includes an AND gate 151 which receives a pump drive command signal P15 from the microcomputer 22 and the 390 Hz pulses P27 from the pulse generator 21. The AND gate 151 connects to a variable frequency pulse generator 152 which comprises a decoder, a counter, and an output gate. The variable frequency pulse generator 152 generates 256 kinds of pulses of different frequencies based on the 390 Hz pulses, and selectively feeds out one of them as specified by an 8-bit code. The pulse generator 152 connects to an amplifier 153. Because the pump 1 is of the type driving a plunger in a reciprocal movement by a solenoid, the amplifier 153 supplies the solenoid with 24 V pulses timed to output pulses of the pulse generator 152.

The ink pressure adjuster 27 comprises an upcounter 271, a subtractor 272, a set of eight switches 273 (eight bits) for predetermining a target drop flight velocity, a latch circuit 277 for holding a subtraction output, a zero-crossing detector 274, an AND gate 275, and OR gates 101, 276 and 278.

The charge detector 19 comprises a resistor 191 for connecting the shield wire 9 to ground, a field effect transistor (FET) 192, a negative phase amplifier 193, a high-pass filter 194, a half-wave rectifier 195, an integrator 196 and a comparator 197. The resistor 191 is designed to have a resistance which is smaller than a resistance developed between the gutter 8 and the filter 10 when they are electrically interconnected by ink, i.e. about 100 kΩ. Here, a small floating capacity exists between the core of the shield wire 9 and ground. In this embodiment, while the core of the shield wire 9 is negatively charged every time a charged ink drop impinges on the gutter 8, it continuously holds the negative potential so long as charged ink drops continuously impinge on the gutter 8, due to the time constant determined by the floating capacity and resistor 191. Hence, where a charge pattern is employed in which a plurality of consecutive drops are charged and the subsequent consecutive drops are not, a potential pattern which is a replica of the charge and uncharge pattern will appear at the gate of the FET 192. This potential pattern is transformed into a current by the FET 192, inverted and amplified by the amplifier 193, removed of low-frequency noise by the high-pass filter 194, and then fed to the zero-crossing detector 274 and half-wave rectifier 195 of the ink pressure adjuster 27.

The microcomputer 22 adapted to control the various elements described above is made up of a general purpose central processing unit or processor, RAM and ROM each with an I/O port, and input/output interfaces.

Figure 7:
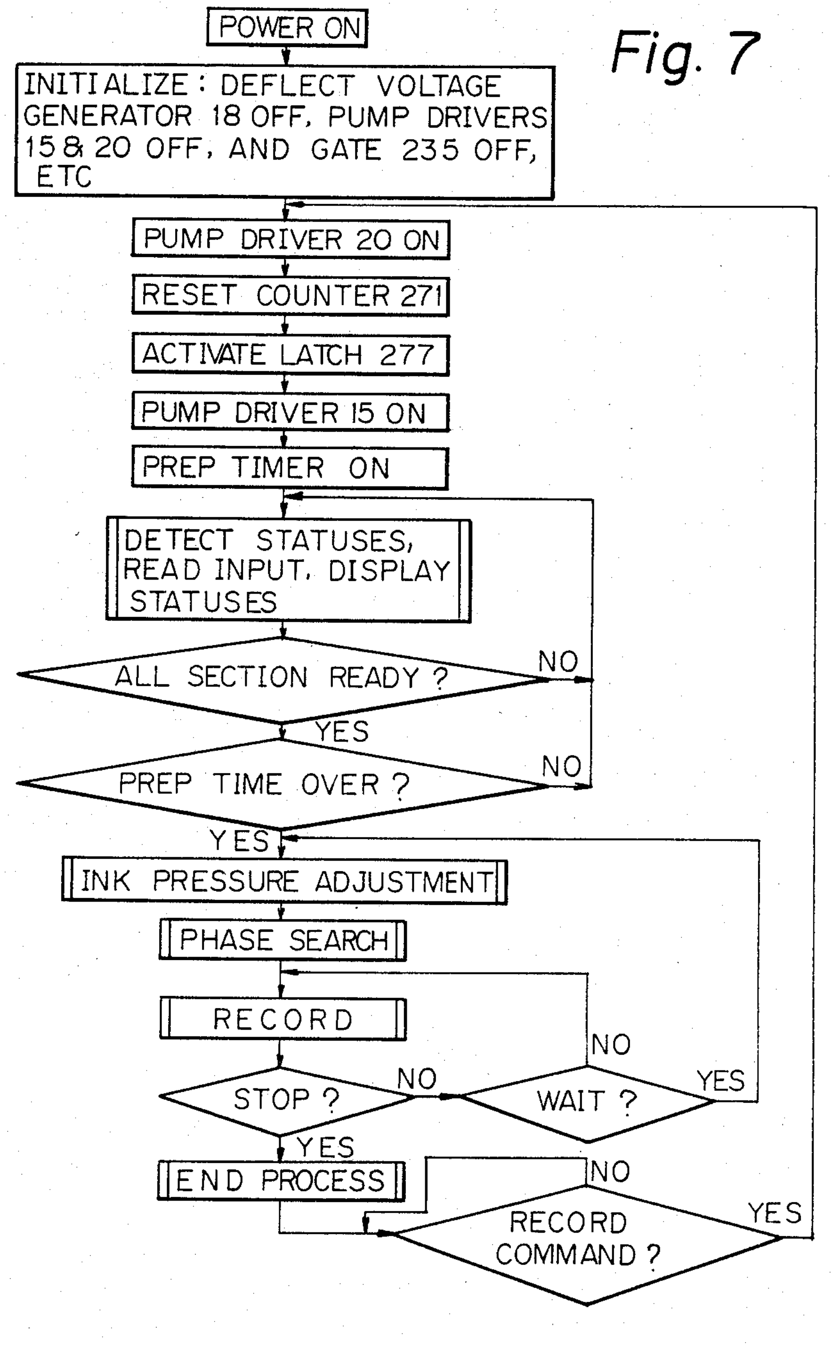
FIG. 7 is a flowchart demonstrating a general control performed by a microcomputer shown in FIG. 3.

A control assigned to the microcomputer 22 is outlined in FIG. 7. Shown in FIG. 8 are the details of an ink pressure control in which an actual ink drop velocity is detected and the ink pressure (delivery pressure of the pump 1) is controlled to make the actual velocity coincide with a target velocity preset by the switches 273.

Referring to FIG. 7, as a power source is turned on, the microcomputer 22 initializes the input and output ports while bringing the various elements into their safe conditions. This turns off the deflection voltage genarator 18, pump drivers 15 and 20, and an AND gate 235. Thereafter, the microcomputer 22 supplies the pump driver 20 with a drive command signal to drive the pump 11 and, then, makes an initial set command signal SR high level for a moment thereby resetting the counter 271 of the ink pressure adjuster 27 and instructing the latch 277 to hold data. The counter 271 is reset (count cleared) and the latch 277 holds input data, each in response to the rise of the signal SR from the low level to the high level. The output of the counter 271 now becomes "00000000" indicative of the count "0 (zero)" so that the output of the subtractor 272 is held by the latch 277 as a target code selected by the switches 273. The latch 277 delivers the incoming code as it is. The variable frequency pulse generator 152 decodes the output code of the latch 277 to produce one of 256 kinds of pulses therefrom. As will be described, the pulse output from the circuit 152 this time is one of different kinds of pulses which can be produced by the then existing positions of the switches 273, the specific one pulse having the highest frequency. Next, the microcomputer 22 drives the pump 1 (makes a signal P15 high level) and turns on a preparation timer (program timer). The AND gate 151 in the pump driver 15 supplies the variable frequency pulse generator 152 with a 390 Hz pulse (P27) so that the pulse generator 152 produces one pulse having the highest frequency out of multiple pulses which can be produced in the present positions of the switches 273. The specific pulse is fed to the amplifier 153 so as to drive the pump 1 at the highest one of all the velocities which the switches 273 can provide in their present positions.

While awaiting the expiration of the preparation time, the microcomputer 22 reads out statuses of the various portions to deliver status data to a higher stage equipment or a control board. If all the portions are ready to print out data and when the preparation time expires, the microcomputer 22 enteres into an ink pressure adjustment and then advances to a record control through a phase search. On the completion of a printout operation, the microcomputer 22 advances to an end procedure similar to the initialization. The ink pressure in the line downsteam of the accumulator 2 increases to a level corresponding to the operating speed of the pump 1 while the preparation timer is in operation, and it will have been stabilized at a certain level when the preparation time is over.

Figure 8:
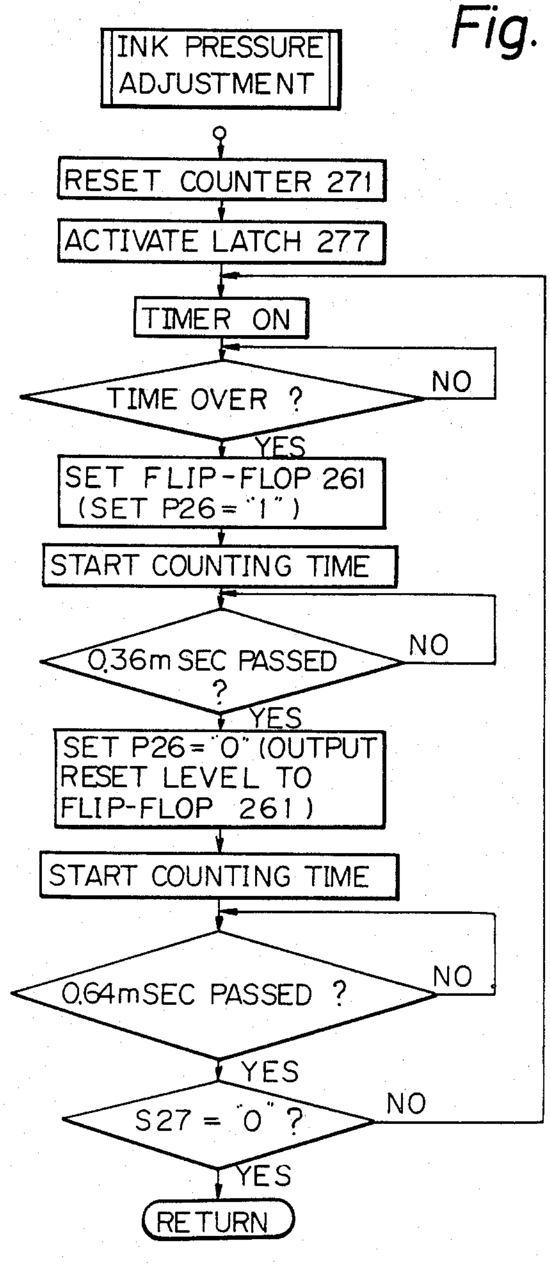
FIG. 8 is a flowchart demonstrating an ink pressure control also performed by the microcomputer of FIG. 3.

Referring to FIG. 8, in the ink pressure adjustment, the microcomputer 22 makes the signal SR high level for a moment to reset the counter 271 of the ink pressure adjuster 27 while activating the latch 277, so that the output of the subtractor 272 of that instant (target value selected by the switches 273) is latched. While a target value will have been stored in the latch 277 in the event of the first ink pressure adjustment after the supply of power, no target value will have been stored in the latch 277 after the first ink pressure adjustment (such as when the microcomputer 22 returns to the ink pressure control through the "WAIT"=YES step in the flow of FIG. 7). In the latter case, therefore, a target value is set in the latch 277 as soon as the ink pressure adjustment begins. Thereafter, the microcomputer 22 triggers a timer (program timer) to start counting a predetermined time (from the instant of a change of pump drive speed to the instant of stabilization of ink pressure in the line downstream of the accumulator). As the timer runs out, the microcomputer 22 supplies the J-K flip-flop 265 of the timing pulse generator 26 and the AND gate 275 of the ink pressure adjuster 27 with a velocity detection command pulse P26 which remains high level for a time somewhat longer than 50 msec. Then, the output PSC of the AND gate 267 of the timing pulse generator 26 becomes high level in synchronism with a pump drive pulse Cpd until the pump drive pulse signal Cpd rises after having risen once. The high level pulse PSC is fed to the flip-flop 261 as a velocity detection sync signal. This causes the AND gate 263 of the timing pulse generator to supply an OR gate 236 of the gate circuit 23 and the OR gate 101 of the ink pressue adjuster 27 with a signal R27 (FIG. 6) which is made high level for 0.36 msec (one period of 3.125 kHz pulses) after two 3.125 kHz pulses have been counted since the rise of the pulse PSC. That is, the flip-flop 261 of the timing pulse generator 26 is set when the 100/32 or 3.125 kHz pulse signal coupled to a clock input terminal CK is low level after the pulse PSC has become high level. Another fall of the 3.125 kHz pulse signal to a low level resets the flip-flop 261 and sets the flip-flop 262, whereby the output R27 of the AND gate 263 becomes high level timed to the 3.125 kHz pulse signal and for one period thereof after the signal P26 has been made high level. 32 ink drops are formed for the high level period of the signal R27.

The output R27 (high level) of the AND gate 263 is fed to OR gates 290–293 of the AND gate 23 via the OR gate 236. A code "0010011100" instructing a predetermined charge level is continuously applied to a digital-to-analog (D/A) converter 232 while 32 ink drops are being formed. Therefore, the D/A converter 232 continously supplies the charge signal amplifier 17 with a predetermined level of voltage during the formation of 32 ink drops. This deposites a charges on each of a string of 32 ink drops.

While ink drops are so charged, that is, while the signal R27 is high level, the counter 271 is reset at the rise of the signal R27 to start couting up from zero, and the AND gate 275 in the ink pressure adjuster 27 is enabled. The 32 charged ink drops sequentially fly to impinge on the conductive gutter 8. The potential of the core of the shield wire 9 starts lowering in the negative direction in response to the impingement of the first charged drop on the gutter 8, and then rises after all the 32 charged drops have impinged, thus undergoing a generally pulse-like variation. The output of the amplifier 193 varies in the positive direction in the manner of pulses corresponding to the potential variation.

As soon as the output of the amplifier 193 rises in the positive direction, that is, just after the string of 32 charged drops have impinged on the gutter 8, the output of the zero-crossing detector 274 of the ink pressure adjuster 27 becomes high level. Because the AND gate 275 has been enabled by the high level of the signal P26, the output of the OR gate 276 becomes high level causing the latch 277 to hold a subtraction output of that instant. Because the counter 271 has been reset to start counting the 133 kHz pulses in response to the rise of the signal R27, the data held by the latch 277 indicates a value obtained by subtracting from the target value the number of 133 kHz pulses counted up from the instant of a start of charging an ink drop to the instant of impingment of a charged ink drop on the gutter 8 (flight time of a charged ink drop). The value given by the subtraction is a deviation from the target value. While the pump 1 is operating at a speed corresponding to the target data, the ink pressure is high and, therefore, the ink drop velocity is high resulting in a small count. It follows that the data held by the latch 277 in the first velocity detection cycle has a relatively large value (deviation from the target value) which maintains the output of the OR gate 278 high level.

When the output of the OR gate 278 is high level, the microcomputer 22 advances to a second velocity detection cycle. For this purpose, the microcomputer 22 triggers a timer (program timer) to start counting a predetermined time (which will allow the ink pressure in the line downstream of the accumulator to become stable after a change of the pump speed.) As this time is over, the microcomputer 22 feeds a signal P26 having a high level time longer than 50 msec (see FIG. 6) to the J-K flip-flop 61 of the timing pulse generator 26 and the AND gate 275 of the ink pressure adjuster 27. In this situation, the output of the latch 277 is a value obtained by subtracting from the target value the count reached by the counter 271 last time and, therefore, the pulse generator 152 supplies the amplifier 153 with a pulse lower in frequency than the first pulse and corresponding to the result of subtraction. This drives the pump 1 at a speed lower than the first maintaining the ink pressure lower than the first. In response to the signal P26, the timing pulse generator 26 generates a signal R27 (see FIG. 6) in the same manner as described and supplies it to the gate circuit 23 and ink pressure adjuster 27. This starts charging a string of 32 ink drops and resets the counter 271 to cause it to count incoming 133 kHz pulses. Just after a charged ink drop has impinged on the gutter 8, the zero-crossing detector 27 turns its output to a high level in response to which the latch 277 holds the instantaneous subtraction output, i.e. the target value minus the time period from the start of charging an ink drop to the impingement of a charged ink drop on the gutter. Because the ink pressure is relatively low in the second velocity detection, the latched data is of a farther smaller value or zero. If zero, the latched data makes the output of the OR gate 278 low level so that the microcomputer 22 advances to a phase search regarding the drop flight velocity as having reached the target value. If not zero, the microcomputer starts a third ink velocity detection cycle in the same manner as the second described above. Such a procedure is repeated until the output of the OR gate 278 becomes low level. In the meantime, the data held by the latch 277 decreases in arithmetic progression while the drop flight velocity converges to the target value also in arithmetic progression.

In the ink pressure adjustment described above, the timing pulse generator 26 responds to a velocity detection command (P26=high level) by generating a charge signal for ink pressure control (R27=high level) timed to the rise of the pump drive pulse Cpd. An ink drop is charged in synchronism with the charge signal. Therefore, drop flight velocity is detected always in a specific phase of ink pressure pulsation. This prevents the ink pressure from being varied from one to another of the several velocity detection cycles and thereby allows an ink pressure (drop flight velocity) to be accurately predetermined on the basis of velocity detection. Thus, an actual drop flight velocity can converge smoothly and stably to a desired value.

The gutter for catching non-printing ink drops is made of a conductive material. Electrically connected with this gutter is the charge detector circuit which shows a potential variation in response to impingement of a charged drop on the gutter, thereby detecting the flight of charged drops. This type of construction insures sharp response to the arrival of a charged drop and exact detection. The drop flight velocity, therefore, can be controlled quickly and positively to a target value. Provision of a single charged drop detector electrode and a single charge detector circuit will not add to the intricacy of the mechanical or electrical construction. It is needless to increase the distance between the head 4 and the sheet 7 which ink drops fly.

Furthermore, the pump pressure is varied in accordance with a difference between actual and target velocities of ink. This allows the ink pressure or ink velocity to be adjusted in arithmetic progression, shortening the time period required for the convergence of the actual velocity to the target velocity.

After the ink pressure adjustment, the microcomputer 22 makes the 3-bit code fed to the data selectors 243 and 252 "000" in order to start a phase search. Simultaneously, the microcomputer 22 enables the AND gate 235 to start counting time. Then, the data selector 243 produces the pulses a of CHP in FIG. 5 while the data selector 252 produces the pulses d of SP in FIG. 5. However, because the output gate of the charge code generator 244 has been disenabled due to the low level print data (non-recording), all the outputs of the charge code generator 244 (charge level command code) are low level, "00000000", maintaining all the AND gates 280–289 disenabled. Meanwhile, the AND gate 234 supplied with the 100/32 or 3.125 kHz pulses is enabled for 16 periods of the 100 kHz signal (during the formation of 32 ink drops) and then disenabled for the next 16 periods (during the formation of 32 ink drops), repeating such an operation pattern thereafter. As a result, 32 consecutive pulses d of SP shown in FIG. 5 are supplied to the OR gates 290–293 via the AND gates 234, 235 and OR gate 236, and then another string of 32 pulses d after an interval corresponding to 32 such pulses. In this manner, the pulses d of SP shown in FIG. 5 are intermittently supplied to the OR gates 290–293.

While 32 consecutive pulses d of SP are coming in in the manner described, the D/A converter 232 is supplied with a code "0010011100" only when the pulse signal d is high level and in turn supplies the charge signal amplifier 17 with a charge signal corresponding to the code "0010011100". As a result, charge pulses appear at the charge electrode 5 which are synchronous with the pulses d of SP and in a pattern in which strings of 32 pulses alternate with intervals each corresponding to 32 such pulses. At this instant, a signal having a frequency of about 100/32 or 3.125 kHz appears at the output terminal of the high-pass filter 194 of the charge detector 19 which holds a positive potential while 32 consecutive charged drops are impinging on the gutter 8, and a negative potential while 32 consecutive uncharged drops are impinging on the same. This signal is rectified by the half-wave rectifier 195 and then integrated by the integrator 196. As soon as the output of the integrator 196 increases beyond a reference level, the comparator 197 changes its output P19 from a high level to a low level. Then, the microcomputer 22 regards the 3-bit code supplied to the data selectors 243 and 252 as one which provides an adequate charge timing and thereby an adequate charge, allowing the 3-bit code to be held in the data selectors 243 and 252. Thereafter, the microcomputer 22 disenables the AND gate 235 to enter into a record control.

The microcomputer 22, as previously described, loads the code "000" in the data selectors 243 and 252, enables the AND gate 235, and triggers the timer. If the output P19 of the comparator 197 does not turn from a high level to a low level before the timer runs out, the microcomputer 22 loads a 3-bit control code "001" in the data selectors 243 and 252, turns on the timer again, and then awaits a change in the output level of the comparator 197 from the high to the low. In response to control code "001", the data selector 243 produces the pulses b of CHP shown in FIG. 5, and the data selector 252 the pulses e of SP. That is, both the data selectors 243 and 252 produce pulses which are delayed in phase by 1/800 msec relative to the pulses which they produced last time. Except for such a phase delay, all the structural elements are operated in the same manner as when the control code "000" was loaded in the data selectors 243 and 252.

On the change of the output level of the comparator 197 from the high to the low, the microcomputer 22 determines that the 3-bit control code then coupled to the data selectors 243 and 252 is the code which provides an adequate charge timing and thereby an adequate charge, thus holding it in the data selectors 243 and 252. The microcomputer 22 then disenables the AND gate 235 and advances to a record control. If the timer has run out before the output of the comparator 197 changes from the high level to the low, the microcomputer 22 loads the data selectors 243 and 252 with a control code "010".

In the same manner, the microcomputer 22 updates the control code fed to the data selectors 243 and 252 every time the timer runs out, so long as the output of the comparator 197 remains high level. As shown in FIG. 5, the pulses a to h of SP which the data selector 252 produces are different in phase from adjacent ones each by the pulse width, 1/800 msec. Therefore, while the control code is changing within the range of "000" to "111", the pulses a to h of SP are selectively fed to the AND gate 234; while any one of the control codes is fed to the data selectors 243 and 252, ink drops will become charged turning the output P19 of the comparator 197 from a high level to a low level. Then, the microcomputer 22 terminates the phase search, sets the control code in the data selectors 243 and 252, and disenables the AND gate 235 to advance to a record control.

In the record control, the microcomputer 22 keeps the AND gate 235 disenabled and the timing pulse generator 26 reset (R27=low level). Under this condition, the output of the OR gate 236 in the gate circuit 23 is maintained low level during the record control, while only the outputs of the AND gates 280–289 are delivered to the D/A converter 232. Thereafter, the microcomputer 22 commands the deflection voltage generator 18 to generate a deflection voltage, whereby a predetermined high voltage is applied across the deflection electrodes. As mentioned, a deflection voltage is supplied to the deflection electrodes during a record control but not during an ink pressure adjustment. This stems from two undesirable situations. In ink velocity detection for ink pressure adjustment, should the deflection voltage be applied to the deflection electrodes, the ink drops would be deflected to fly a longer path and proportionally become susceptive to the ambient conditions; it is necessary to cause ink drops to fly straight and make the flight path shortest. The gutter for detecting charged ink drops is adapted to capture uncharged drops and, therefore, excessive deflection of drops would make the drop detection impossible.

The charge code generator 244 is supplied with a reset signal just before the delivery of one character of print data. In response to the reset signal, the charge code generator 244 clears the count and starts upcounting the 100 kHz pulses which are output from the pulse generator 21. The count code is fed to the AND gates 280–289 only when the print data is high level (record command). From the AND gates 280–289, the count code is fed to the D/A converter 232 while an output CHP of the data selector 243 (one of a to h specified by a 3-bit control code fed to the data selectors 243 and 252) is high level.

The signal CHP output from the data selector 243 has a high level duration which is eight times that of a signal SP which is determined by the phase search as effecting charging (one of e to h specified by the control code then fed to the data selectors 243 and 252), the high level duration of the latter occurring at the center of the high level duration of the former. Therefore, the record charge pulse supplied to the charging electrode 5 has a relatively large width which covers the period from the instant just before the seperation of ink into a drop to the instant just after the separation, so that the ink drop is positively charged to a level corresponding to the output code of the charge code generator 244. In the course of the flight between the deflection electrodes, the charged ink drop is deflected by an amount proportional to the charge thereof. Uncharged drops, as distinguished from the charged drops which impinge on the sheet 7, are caused to fly without deflection, caught by the gutter 8, and then sucked by the pump 11 via the filter 10.

As described hereinabove, an ink pressure adjustment occurs first in which the ink pressure is predetermined to allow ink drops to fly at a target velocity, thereby controlling the actual ink velocity to the desired value. The ink pressure adjustment is followed by a phase search in which the phase of a charge signal is selected to positively charge ink drops. This is followed by a record charging. This procedure, positively setting a charging timing with the ink velocity kept constant, is effective to insure quality printout operation.

During the course of ink pressure adjustment and phase search, the supply of deflection voltage is interrupted so that even the charged drops fly straight toward the gutter and deposition of a charge on a drop is detected. That is, an ink velocity is detected in the adjustment of ink pressure while causing charged drops to follow a straight path. This minimizes the length of the ink flight path for velocity detection and thereby promotes stable and accurate velocity detection.

In a printout operation a deflection voltage is applied across the deflection electrodes to deflect charged drops toward the sheet while capturing uncharged drops by the gutter.

In short, a single conductive gutter is used for three different purposes: for the detection of a drop flight velocity, for searching a phase, and for capturing non-printing drops in a printout operation. This simplifies both the mechanical and electrical arrangements of an ink jet printer. Nevertheless, the velocity detection and phase search preserves accuracy and stability.

While the ink velocity detection has been shown and described as employing a conductive gutter which captures non-printing ink drops during a printout operation, it may be replaced by any other drop impingement type charge detection electrode or even by a non-impingement type electrode (e.g. induction type).

In summary, it will be seen that the present invention provides a deflection control type ink jet recording apparatus which achieves accurate and stable detection of a flight velocity of ink drops and thereby accurate, stable and quick setting of an ink flight velocity (ink pressure).

Various modifications will become possible for those skilled in the art after receiving the teachings of the present disclosure without departing from the scope thereof.

What is claimed is:

1. A deflection control type ink jet recording apparatus having an ink ejection head equipped with an ink ejection nozzle and a vibrator for applying pressure oscillation having a predetermined period to ink in an ink chamber, which communicates to the ink ejection nozzle, a pump for supplying ink under pressure to the ink ejection head, a charging electrode for applying a charging electric field to ink ejected from the nozzle, charge voltage generator means for applying a charge voltage to the charging electrode, and a deflection electrode for applying a deflecting electric filed to charged ink drops, said apparatus comprising:

means for detecting arrival of a charged ink drop, said means being located in an ink flight path or neighborhood thereof, said ink flight path extending from the charging electrode to a recording sheet;

electric circuit means connected to said charged ink drop arrival detecting means for generating a signal indicative of arrival of a charged ink drop;

charge voltage generator means for generating a charge voltage for controlling an ink pressure;

sync means for synchronizing the charge signal for ink pressure control to a pump drive signal; and ink pressure adjuster means for supplying a pump drive circuit, which drives the pump, an ink pressure command signal which is based on a period from an instant of charging of an ink drop in response to the ink pressure control charge signal to an instant of detection of the charged ink drop, starting from a point where the ink pressure control charge signal appears.

2. The apparatus as claimed in claim 1, in which the drop arrival detecting means comprises a charge detection electrode disposed in a path of flight of charged ink drops, the electric circuit means for generating a signal indicative of a charged ink drop comprising a charge detector circuit which generates a signal indicative of impingement of a charged ink drop on said charge detector electrode.

3. The apparatus as claimed in claim 2, in which the charge detector electrode comprises a gutter made of an electroconductive material and disposed between the deflection electrode and the recording sheet to capture non-printing ink drops during a printout operation.

4. The apparatus as claimed in claim 3, in which the charge detector circuit includes an amplifier which is connected to the gutter by a shield wire.

5. The apparatus as claimed in claim 1, in which the ink pressure adjuster means is constructed to compensate an ink pressure commanded last time with a difference between time information obtained from the ink pressure commanded last time and a predetermined target value, thereby preparing a second ink pressure command signal.

6. The apparatus as claimed in claim 3 or 4, in which the ink pressure adjuster means is constructed to interrupt the supply of a deflection voltage to the deflection electrode until a charged ink drop impinges on the gutter, starting at least from the point of appearance of the ink pressure control charge signal.

* * * * *